Figure 4:
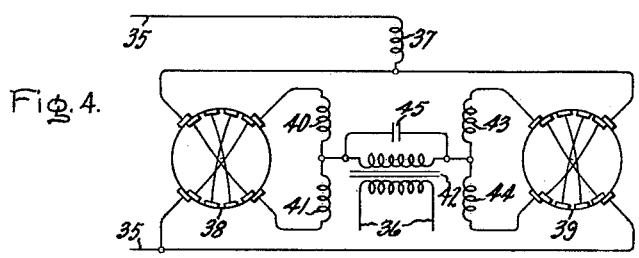

May 6, 1941.   B. D. BEDFORD ET AL   2,241,050
ELECTRIC CIRCUITS
Filed June 1, 1938   2 Sheets-Sheet 1
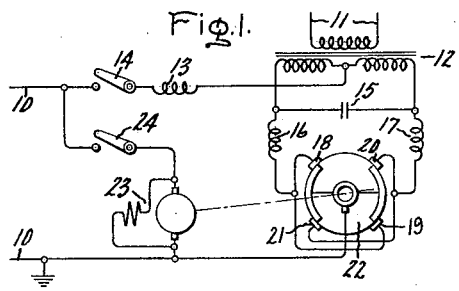
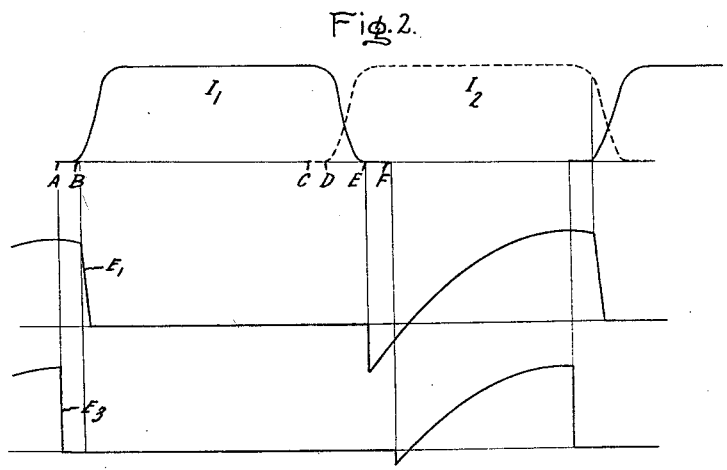
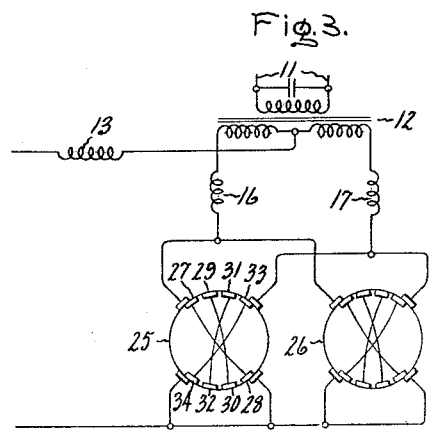
Inventors:
Burnice D. Bedford,
Martin A. Edwards,
by Harry E. Dunham
Their Attorney.

Inventors:
Burnice D. Bedford,
Martin A. Edwards,
by Harry E. Dunham
Their Attorney.

Patented May 6, 1941

2,241,050

UNITED STATES PATENT OFFICE 2,241,050

ELECTRIC CIRCUITS

Burnice D. Bedford and Martin A. Edwards, Schenectady, N. Y., assignors to General Electric Company, a corporation of New York Application June 1, 1938, Serial No. 211,194

12 Claims. (Cl. 175—364)

Our invention relates to electric circuits, and more particularly to rotary circuit interrupting means for use in conjunction with electric circuits of the inverter type.

In some instances, it has been found desirable to provide an electric circuit of the inverter type for supplying energy to an alternating current load circuit where only a direct current supply circuit is available. Such instances where it is desired to utilize electric discharge illuminating devices of the type disclosed in Patent No. 2,170,449, granted August 22, 1939, to Martin A. Edwards and assigned to the same assignee as the present application. Such electric discharge apparatus comprises a tubular envelope having a pair of electrodes arranged at opposite ends of the envelope and which necessitate the application of alternating potentials to these electrodes. This envelope usually contains a rare gas such as argon, and preferably a vaporizable medium such as mercury, and the inner surface of the envelope is coated with a fluorescent material so that the discharge which may be of low luminosity in itself will produce a high degree of illumination. It has been found desirable to utilize such electric discharge devices on railway cars and it was desired to use the available source of energy which comprises a storage battery or an axle generator. In accordance with our invention, we provide an electric circuit of the inverter type utilizing a rotary distributor or circuit interrupting means so as to change the direct current energy into alternating current energy. In such circuits employing rotary or mechanical interrupting means, it is desirable to reduce as much as possible the current to be interrupted so that the distributor or interrupting means may be correspondingly reduced in size and rating. In a copending application for Letters Patent, Serial No. 113,581, filed December 1, 1936, by Burnice D. Bedford for Electric circuits, and assigned to the same assignee as the present application there is disclosed an arrangement effecting a substantial reduction in a current to be interrupted. In accordance with our present invention, this feature of providing means for substantially reducing the current to be interrupted is incorporated in an inverter circuit utilizing a rotary distributor or circuit interrupting means.

It is an object of our invention to provide an improved electro-mechanical inverter apparatus.

Still another object of our invention is to provide an improved rotary distributor or circuit interrupting means.

Still another object of our invention is to provide an improved circuit interrupting means and circuit whereby the detrimental effects obtained during abnormal operation may be considerably reduced.

The novel features which we believe to be characteristic of our invention are set forth with particularity in the appended claims. Our invention, itself however, both as to its organization and method of operation, together with other and further objects and advantages thereof may be best understood with reference to the following description taken in connection with the accompanying drawings in which Fig. 1 represents a simplified arrangement embodying our invention; Fig. 2 shows a plurality of curves illustrating the operation of our invention; and Figs. 3 to 6 show various modifications and improvements embodying our invention.

Referring to Fig. 1 of the accompanying drawings, we have chosen to represent our invention as applied to an inverter system operating to interconnect the direct current circuit 10 and an alternating current circuit 11. This inverter apparatus includes a transformer 12, the secondary winding of which is connected to the alternating current circuit 11 and the midpoint of the primary winding of which is connected to one side of the direct current circuit 10 through a smoothing reactor 13 and a control switch 14. The primary winding of the transformer 12 is provided with a capacitor 15 which supplies the necessary commutating voltage, and each of the outer extremities of this winding are connected through saturable reactors 16 and 17 to a pair of brushes 18, 19 and 20, 21 of a distributor mechanism 22. The distributor mechanism 22 is provided with two equal size conducting segments which are connected by means of a slip ring and brush to the other side of the direct current circuit 10. The distributor or circuit interrupting means 22 is arranged to be driven by a motor 23, the energization of which is controlled by a switch 24. The two conducting segments and the slip ring of the distributor 22 operate to generate two cycles of alternating potential for each revolution of the distributor. Four brushes 18 to 21 are utilized so as to have two brushes in parallel and thereby to provide a simple means of controlling the overlap of the brushes. For example, it would occur to one skilled in the art to mount one of the brushes of each set of two brushes connected in parallel so that it is movable relative to the other brush in the set thus providing means for controlling the overlap. The same result could be obtained by providing means for adjusting the length of the conducting commutating segment, as for example by constructing each conducting segment of two parts one movable relative to the other. In accordance with our invention, we utilize saturable reactors 16 and 17 in series relation between the outer terminals of the primary windings of the transformer 12 and the pairs of brushes of the distributor or circuit interrupting means 22. These saturating reactors, which have a nonlinear reactance characteristic, serve to reduce the current flowing through the distributor or circuit interrupting means immediately prior to and during the circuit interrupting intervals so that the duty imposed on the circuit interrupting means 22 is materially lessened. The use of a pair of brushes for each of the circuits including the saturable reactor provides a suitable overlap which permits the next succeeding operating circuit to be closed just prior to the opening of the present operating circuit. At the time that current is about to be transferred from one set of brushes to another the capacitor 15 supplies a commutating potential which, together with the saturable reactors, tends to reduce the current flowing through the reactor and through the brushes. The reactors 16 and 17 are designed to become saturated at comparatively low values of current transmitted through these reactors. A reductor of the current through the saturable reactor desaturates the reactor and thereby causes a substantial increase in the inductance of this element. Because of this fact a current through the saturable reactor will be decreased to a relatively small value near the end of the conducting interval so that the brushes 18 to 21 will be required to interrupt only relatively small portions of current compared with the current which has been previously transmitted through the brushes.

If it is assumed that the distributor mechanism 22 is in the position shown in the figure the switch 24 may be closed thus energizing the motor 23 which causes a clockwise rotation of the distributor means 22. When the motor 23 has reached a steady or normal operating speed the switch 14 is closed thus energizing the inverting apparatus. Current will now flow through the smoothing reactor 13, the left-hand portion of the primary winding of the transformer 12, the saturable reactor 16 and the brushes 18 and 19 to the other side of the direct current circuit. After the distributor has rotated one-quarter of a revolution the saturable reactor 16 and the commutating capacitor 15 cooperate to reduce the current flowing through the brushes 18 and 19 and the brushes 20 and 21 will make contact with the conducting segments of the distributor means 22 prior to the time that the brushes 18 and 19 break the contact. The saturable reactance means 17 during this time serves to maintain the current through the brushes 20 and 21 at a relatively low value until the current through the brushes 18 and 19 is about to be interrupted. During the next quarter revolution of the distributor means 22 current will flow through the smoothing reactor 13, the right-hand portion of the primary winding of the transformer 12, the saturable reactor 17 and the brushes 20 and 21 to the other side of the direct current circuit. The alternate transmission of current through the right and left-hand portions of the primary winding of the transformer 12 will produce alternating current in the secondary winding which is connected to the alternating current circuit 11. Thus during each revolution of the circuit interrupting means 22 there will be supplied to the alternating current circuit 11 two cycles of alternating current. When it is desired to discontinue the operation of the inverter it is preferable to simultaneously open the control switches 24 and 14.

The operation of the apparatus shown in Fig. 1 will be better understood by referring to the characteristic curves of Fig. 2. In the upper curve of Fig. 2 a solid line curve $I_1$ indicates the current transmitted, for example, by brushes 18 and 19, and the curve $I_2$ indicates the current transmitted by the brushes 20 and 21. Since pairs of brushes are utilized, thereby providing an overlap, it will be apparent that the curves $I_1$ and $I_2$ have this overlap for a predetermined time. The high inductance of the saturable reactance causes the current to build up slowly. This is shown in curve $I_1$ by that portion of the curve between A and B. At the point C the circuit is closed for the next succeeding set of brushes and the current slowly builds up until the time D because of the high inductance of the saturable reactor. From the time D to E the reactor is saturated and the current builds up rapidly. During this same time interval from D to E the current $I_1$ is rapidly decreasing and the high inductance of the saturable reactor causes the current to decrease very slowly during the time interval E—F. At the point F the one pair of brushes is no longer in contact with the conducting segment of the distributor 22. If the saturable reactors 16 and 17 are not utilized the current interrupted by the brushes will be relatively large, and this would tend to produce sparking which would deteriorate the brushes and the conducting segments. The next curve in Fig. 2 shows the voltage $E_1$ which appears across the reactor and a pair of brushes such as reactor 16 and brushes 18 and 19. The last curve of Fig. 1, showing the voltage $E_3$, illustrates the voltage appearing across the distributor 22.

The arrangement shown in Fig. 3 embodies a circuit similar to that shown in Fig. 1, but the single distributor has been replaced by two distributors each of which is provided with four brushes. These distributors provide the same number of conducting intervals as does the distributor mechanism 22 of Fig. 1 but this interval is divided into a plurality of segments to improve the operation under abnormal conditions. Two of these brushes of each distributor are connected to one side of the direct current circuit so that during each conducting interval two brushes, an upper brush and a lower brush, will interrupt the current at the end of the conducting interval. This opening of the circuit simultaneously by two brushes provides protection during abnormal conditions when the distributor or interrupting means may be required to carry and interrupt appreciable amounts of current. Thus in Fig. 3, two distributors 25 and 26 perform a function similar to the distributor 22 of Fig. 1. The distributor 25, for example, has segments 27 and 28 connected together and similarly segments 29 and 30, 31 and 32, and 33 and 34, are each connected together in pairs. The arc of the circumference of the distributor 25 subtended by the segments 27, 29, 31 and 33 is equal to the arc subtended by one of the conducting segments of the distributor 22 in Fig. 1 and hence the conducting intervals are equal. In the arrangement shown, a capacitor 15 is connected across a secondary winding of a transformer instead of the primary winding but the function of the capacitor and the operation thereof is the same as in Fig. 1. Since the operation of this circuit is in effect the same as that of Fig. 1, it is believed that no further explanation thereof will be necessary.

In Fig. 4, I have shown another modification of our invention in which energy from a direct current circuit 35 is transferred to the alternating current circuit 36. This includes a suitable smoothing reactor 37 which is connected to one brush of each of the distributors 38 and 39. The distributors 38 and 39 are of a form similar to the distributors disclosed in Fig. 3. The other side of the direct current circuit 35 is connected to another brush of each of the distributors 38 and 39. The remaining brushes of the distributor 38 are each connected to saturable reactors 40 and 41, a common junction of which is connected to the primary winding of a transformer 42. Similarly, the other brushes of the distributor 39 are each connected to saturable reactors 43 and 44, the common junction of which is connected to the other side of the primary winding of the transformer 42. The primary winding of the transformer 42 may be connected in parallel through a capacitor 45 which supplies the necessary commutating voltage so that the saturable reactors may operate to reduce the current flowing through the brushes and conducting segments to a relatively small volume at the end of the conducting interval. This circuit, therefore, operates as a single phase full wave circuit as will be apparent to those skilled in the art in distinction to the operation of the circuit arrangement shown in Figs. 1 to 3 which may be referred to as of the half wave type of operation.

Figure 5:
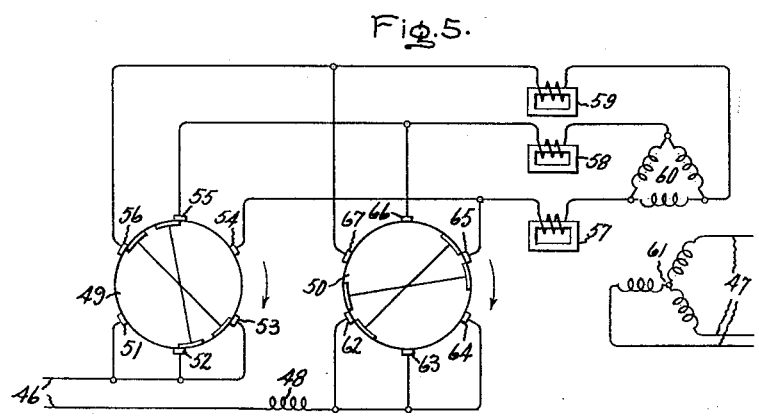

The arrangement shown in Fig. 5 is utilized to transmit the current from the direct current circuit 46 to the alternating current circuit 47. One of the direct current conductors 46 includes a suitable smoothing reactor 48. Two distributors 49 and 50 each are provided with two pairs of conducting segments and each distributor has three brushes connected to the direct current circuit and three brushes connected to the alternating current circuit. Thus the distributor 49 has six brushes equally displaced about its periphery so that brushes 51 to 53 are connected to one side of the direct current circuit 46 and each of the brushes 54 to 56 is connected through one of a plurality of saturable reactors 57 to 59 to the primary winding 60 of a transformer the secondary winding 61 of which is connected to the alternating current circuit 47. Similarly, the distributor 50 has three brushes 62 to 64 connected to the other side of the direct current circuit 46 through the smoothing reactor 48 and each of the three brushes 65 to 67 is connected through the saturable reactors 57 to 59 to the primary winding 60 of the output transformer. Of course it will be obvious to one skilled in the art that some commutating means should be provided such, for example, as was described in connection with Figs. 1, 3 and 4. By this arrangement the split conducting segments of the distributors are not necessary since two segments in each distributor would produce an operative arrangement. The distributors shown have the advantage that they provide additional protection for abnormal operating conditions and each brush of each distributor conducts current for a 120 electrical degree period for every cycle of alternating current appearing in the output circuit.

Figure 6:
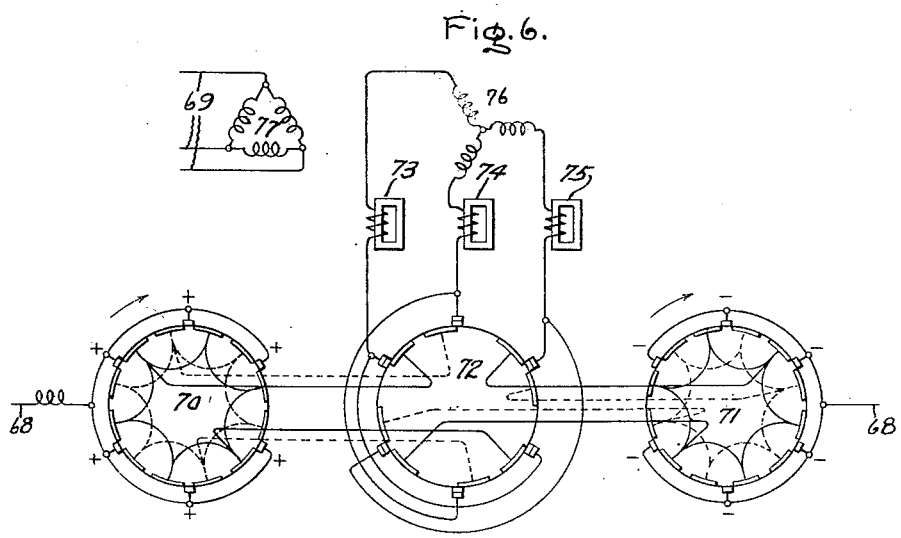

Still another form of distributor is shown in the arrangement of Fig. 6 wherein energy is transmitted from the direct current circuit 68 to the alternating current circuit 69. This arrangement utilizes two distributors 70 and 71 each having twelve conducting segments arranged in two groups and a third distributor 72 having eight conducting segments arranged in two groups. For the purposes of clarity the circuit for one group of segments on the various distributors has been shown by a solid line and the other circuit for the other group of distributor segments has been shown by a dotted line. Each of the distributors 70 to 72 is provided with six brushes and in the distributors 70 and 71 all of the brushes are connected to the direct current circuit 68. In the distributor 72 opposite brushes are arranged in pairs so that each pair is connected through a different one of a plurality of saturable reactors 73 to 75 to the primary winding 76 of a transformer the secondary winding 77 of which is connected to the alternating current output circuit 69. Distributors 70 and 71 perform the function of slip rings but in addition provide a double make and break contact for each of the conducting segments of the distributor 72 thereby insuring greater reliability in operation. Some well known form of commutating means as, for example, parallel condenser commutation disclosed in Figs. 1, 3 and 4 may be provided.

While for the purposes of illustration the various embodiments have been described as operating to transmit current from a direct current circuit to an alternating current circuit, it will be apparent to those skilled in the art that these circuits may be utilized for transmitting current from an alternating current circuit to a direct current circuit. In such case it will be apparent that the motor operating the circuit interrupting means will be of a synchronous type and that it will be energized from the alternating current supply circuit.

While we have shown and described our invention in connection with certain specific embodiments, it will, of course, be understood that we do not wish to be limited thereto, since it is apparent that the principles herein disclosed are susceptible of numerous other applications, and modifications may be made in the circuit arrangement and in the instrumentalities employed without departing from the spirit and scope of our invention as set forth in the appended claims.

What we claim as new and desire to secure by Letters Patent of the United States, is:

1. In combination, an alternating current circuit, a direct current circuit, a translating apparatus interconnecting said circuits, said apparatus including circuit interrupting means comprising a rotary distributor having a plurality of groups of conducting segments for each interval of conductivity, the segments of one group being serially connected with the segments of another of said groups, a plurality of brushes cooperating with said distributor and connected so that circuits including in series a segment from each group are completed successively as said distributor is rotated.

2. In combination, a supply circuit, a load circuit, one of said circuits being alternating current and the other direct current, a translating apparatus interconnecting said circuits, said apparatus including circuit interrupting means comprising a rotary distributor having a nonconducting segment for each interval of nonconductivity and a plurality of groups of conducting segments for each interval of conductivity, the segments of certain of said groups being connected with the segments of other of said groups, and a plurality of brushes associated with said direct and alternating current circuits and cooperating with said distributor, said brushes being so connected and positioned that segments of certain of said groups are connected in series with one another and in parallel with other of said brushes and the series connected conducting segments engaged thereby so that two parallel circuits are completed for each interval of conductivity and each of said parallel circuits is interrupted in two places in series at the end of each interval of conductivity.

3. In combination, a direct current circuit, an alternating current circuit, a translating apparatus interconnecting said circuits and including circuit interrupting means comprising a plurality of rotary distributors each having a plurality of conducting segments for each interval of conductivity, a plurality of brushes cooperating with said distributors, a plurality of saturable reactors connected to certain of said brushes for decreasing the rate of change of current therethrough near the end of the conducting intervals of said distributors and during the circuit interrupting operation.

4. The combination comprising a direct current circuit, an alternating current circuit, an inductive winding associated with said alternating current circuit, and circuit interrupting means interconnecting said direct current circuit with said inductive winding, said circuit interrupting means comprising a rotary distributor having a plurality of groups of conducting and a plurality of nonconducting segments, conductors interconnecting the segments of certain of said groups with the segments of certain other of said groups, a plurality of pairs of brushes associated with each of said circuits cooperating with said distributor, the brushes associated with each of said circuits being positioned to engage selected groups of said conducting segments as said distributor is rotated so that two circuits in parallel are completed through said interrupting means for each interval of conductivity and each of said parallel circuits is interrupted by two brushes at the end of each interval of conductivity.

5. In combination, a direct current circuit, an alternating current circuit, a translating apparatus interconnecting said circuits and including a plurality of inductive windings, means for producing a commutating potential, said inductive winding being arranged to interchange energy with said alternating current circuit, circuit interrupting means connected between said inductive winding and said direct current circuit, said interrupting means comprising a plurality of rotary distributors each having a plurality of conducting segments for each interval of conductivity thereof, a plurality of brushes cooperating with said distributor, a plurality of saturable reactors connected between said brushes and said inductive windings for decreasing the rate of change of current through said interrupting means near the end of the conducting intervals thereof and during the circuit interrupting operation.

6. In combination, a direct current circuit, an alternating current circuit, an inductive network associated with said alternating current circuit, circuit interrupting apparatus interconnecting said inductive winding with said direct current circuit, said apparatus comprising a plurality of rotary distributors each having a conducting interval and a nonconducting interval, each of said conducting intervals being provided with a plurality of conducting segments, a plurality of brushes cooperating with said rotary distributors, and a plurality of saturable reactors connected between said brushes and said inductive networks for decreasing the rate of change of current to said brushes near the end of the conducting intervals of said distributors and during the circuit interrupting operation.

7. The combination comprising a direct current circuit, an alternating current circuit, an inductive winding associated with said alternating current circuit, circuit interrupting apparatus interconnecting said direct current circuit and said inductive winding, said apparatus including a plurality of rotary distributors each having a conducting interval and a nonconducting interval, said conducting intervals each comprising a plurality of conducting segments, a plurality of brushes cooperating with said distributors, certain of said brushes associated with each of said distributors being connected to said direct current circuit, and saturable reactance means interconnecting the remaining brushes with said inductive windings, said reactance means operating to decrease the rate of change of current through said interrupting means near the end of the conducting intervals thereof and during the circuit interrupting operation.

8. In combination, an alternating current circuit, a direct current circuit, a translating apparatus interconnecting said circuits, said apparatus including circuit interrupting means comprising a rotary distributor having a plurality of conducting segments, a plurality of brushes cooperating with said distributor and at least a part of which are angularly adjustable with respect to said distributor, said brushes connected so as to have two brushes in parallel so that adjustment of certain of said brushes controls the overlap of the brushes, and reactance means connected in series relation with said brushes for decreasing the rate of change in current conducted thereby immediately prior to and during the circuit interrupting operation.

9. In combination, a supply circuit, a load circuit, one of said circuits being alternating current and the other direct current, a translating apparatus interconnecting said circuits, said apparatus including circuit interrupting means comprising a rotary distributor having a plurality of conducting segments, a plurality of sets of brushes cooperating with said distributor and certain of said brushes being angularly adjustable with respect to said distributor, each of said sets comprising two brushes connected in parallel so that adjustment of certain of said brushes controls the overlap of the brushes, and saturable reactance means connected in series relation with said sets of brushes for decreasing the rate of change of current through said brushes near the end of the conducting intervals thereof and during the circuit interrupting operation.

10. In combination, a direct current circuit, an alternating current circuit, a translating apparatus interconnecting said circiuts and including circuit interrupting means comprising a rotary distributor having a plurality of conducting segments for each interval of conductivity, a plurality of sets of brushes cooperating with said distributor, certain of said brushes being angularly adjustable with respect to said distributor, each of said sets comprising two brushes connected in parallel so that adjustment of certain of said brushes controls the overlap of the brushes, a plurality of saturable reactances connected in series relation with said sets of brushes for decreasing the rate of change of current therethrough near the end of the conducting intervals of said distributors and during the circuit interrupting operation.

11. In combination, a direct current circuit, an alternating current circuit, a translating apparatus interconnecting said circuits and including a plurality of inductive windings, means for producing a commutating potential, said inductive windings being arranged to interchange energy with said alternating current circuit, circuit interrupting means connected between said inductive windings and said direct current circuit, said interrupting means comprising a plurality of rotary distributors each having a plurality of conducting segments for each interval of conductivity thereof, a plurality of brushes cooperating with said distributor and arranged in such a manner with said plurality of conducting segments that at least two of said brushes interrupt the current at the end of each conducting interval.

12. In combination, a direct current circuit, a polyphase alternating current circuit having a translating apparatus interconnecting said circuits and including circuit interrupting means comprising a plurality of rotary distributors each having a plurality of pairs of conducting segments for each interval of conductivity, a plurality of brushes cooperating with said distributors and arranged in such a manner with respect to said plurality of pairs of conducting segments that at least two brushes interrupt the current at the end of each conducting interval.

BURNICE D. BEDFORD.
MARTIN A. EDWARDS.